July 20, 1954 — J. A. POTCHEN — 2,683,926
METHOD OF FABRICATING WINDOW PANELS
Original Filed June 8, 1949
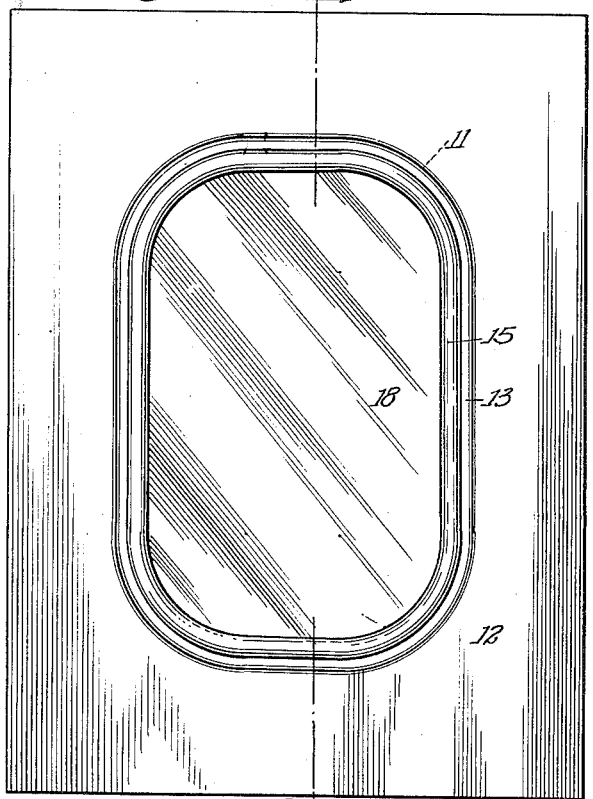
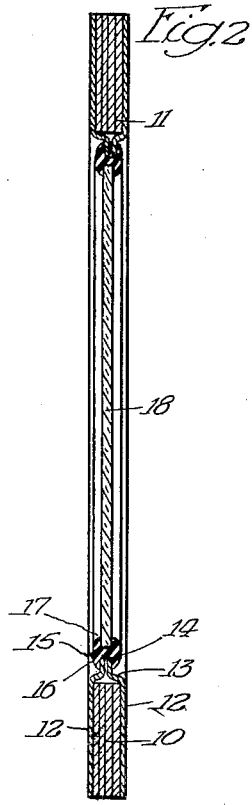
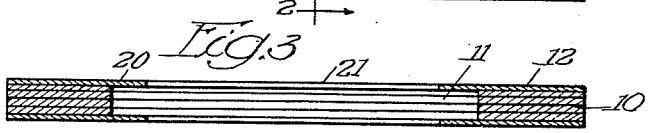
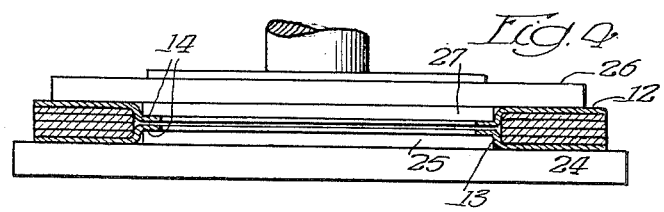
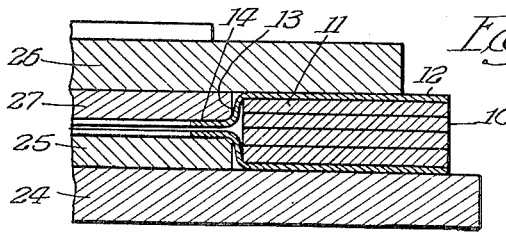
INVENTOR.
Joseph A. Potchen
By: Fred Gerlach
his Atty.

Patented July 20, 1954

2,683,926

UNITED STATES PATENT OFFICE 2,683,926

METHOD OF FABRICATING WINDOW PANELS

Joseph A. Potchen, Grand Rapids, Mich., assignor to Haskelite Manufacturing Corporation, Grand Rapids, Mich., a corporation of New York Original application June 8, 1949, Serial No. 97,878, now Patent No. 2,609,896, dated September 9, 1952. Divided and this application September 6, 1951, Serial No. 245,383

2 Claims. (Cl. 29—480)

The invention relates to window panels.

One object of the invention is to provide a simple and improved method for fabricating window panels which comprise a core and metal facing sheets.

Other objects of the invention will appear from the detailed description.

The invention consists in the several novel features hereinafter set forth and more particularly defined by claims at the conclusion hereof.

In the drawings:

Fig. 1 is a side elevation of a window panel embodying the invention;

Fig. 2 is section taken on line 2—2 of Fig. 1;

Fig. 3 is a section illustrating the blank including the core and casing sheets bonded thereto, before the margins of the facing sheets have been bent into the opening in the core;

Fig. 4 is a view illustrating the panel in section in a press for bending the margins of the sheets to form flanges in the opening in the core, the die members being shown in elevation;

Fig. 5 is a partial view illustrating the dies in section.

The invention is exemplified in a method of fabricating a panel which may be part of a door, wall or other structure which is to be provided with a window. The panel comprises a substantially rigid core 10, which may be of laminated wood or veneer. Facing sheets of suitable metal, such as aluminum, are bonded by high strength glue to the faces of the core. The core is provided with a window opening 11 of a contour corresponding to the contour of the window desired. The facing sheets are provided with openings and integral portions of angular cross-section projecting inwardly of the edge of the opening 11 in the core, and include members 13 which extend toward each other and terminate in complemental substantially parallel flanges 14. The edges of the flanges 14 conform in contour to the contour of the opening 11. A band 15 of elastic material, such as rubber, is provided with an outer groove 16 into which the flanges 14 extend and whereby said flanges will be elastically gripped by the hand. Elastic band 15 is also provided with an inner groove 17 in which the margins of a transparent plate 18 are supported.

The method of fabricating the panel is as follows: The laminations of core 10 are glued together and an opening 11 conforming to the contour of the window desired is cut through the core. The facing sheets 12 of soft metal, such as aluminum, with openings 21 cut therein are bonded to the opposite sides of the core to integralize the core and the facing sheets. The facing sheets are flat and provided with openings 21 conforming to the contour of the opening 11 in the core and with marginal portions 20 around openings 21 which project inwardly from the edge of the opening 11 in the core, as illustrated in Fig. 3. This provides a blank composed of facing sheets and laminated core bonded together with the openings 21 conforming to the contour of the window opening in the core and marginal inwardly projecting portions 20 on the sheets. Next the blank illustrated in Fig. 3 is operated on in the press to bend the marginal portions 20 of the facing sheets into angular cross-section to form members 13 and flanges 14. The blank is placed on a platen or press member 24 on which is mounted a die 25. A movable press member 26 is provided on its underside with a die member 27. The press is operated to move the dies together and bend the marginal portions 20 of the facing sheets into angular cross-section, as illustrated in Figs. 4 and 5. In this operation the dies will bend the marginal portions 20 of the facing sheets around the edge of the opening 11 in the core into angular cross-section with the flanges 14 in close proximity to each other in the opening 11 in the core and on the margins of the facing sheets. The dies 25 and 27 are contoured to conform to the edge of the core around the opening 11. This bending operation can be performed with dies formed of compressed wood pulp die stock which can be readily shaped to the contour of the window-opening. During the bending operation the edge of the core around opening 11 is sufficiently rigid for bending the margins of the sheets into angular cross-section without female die-members and the bonding of the sheets to the faces of the core confines the bending to the marginal portions 21. By effecting the bending without female dies or utilizing the core as a bending member and die members of compressed wood-pulp die stock, the method of bending the facing sheets may be economically practiced.

The invention exemplifies a method of fabricating window panels built up of a laminated core and facing sheets bonded thereto with integral flanges in the window opening for retaining an elastic band for mounting a glass panel in the window opening which can be economically performed.

This application is a division of the application for United States Patent No. 2,609,896, dated September 9, 1952.

The invention is not to be understood as restricted to the details set forth since these may be modified within the scope of the appended claims without departing from the spirit and scope of the invention.

Having thus described my invention what I claim as new and desire to secure by Letters Patent is:

1. That improvement in fabricating a window panel which comprises: cutting in a preformed core an opening conforming to the contour of a window, bonding to the faces of the core substantially flat sheets of metal having openings therein conforming to the contour of the opening in the core, and marginal portions projecting inwardly from the edge of the opening in the core, and thereafter bending said projecting marginal portions around the edge of the opening in the core to form inset complemental flanges adapted to receive an elastic band for mounting a transparent plate across the openings in the sheets and the core.

2. That improvement in fabricating a window panel which comprises: cutting in a core of prebonded laminations an opening conforming to the contour of a window, bonding to the faces of the core sheets of metal having openings therein conforming to the contour of the opening in the core, and marginal portions projecting inwardly from the edge of the opening in the core, and thereafter bending simultaneously the marginal portions of both sheets around the edge of the opening in the core to form inset complemental flanges around the opening in the core, adapted to receive an elastic band for supporting a transparent plate across the openings in the sheets and the core.

References Cited in the file of this patent

UNITED STATES PATENTS

| Number | Name | Date |
| --- | --- | --- |
| 1,888,166 | Geipel | Nov. 15, 1932 |
| 2,114,442 | Fitzgerald | Apr. 19, 1938 |
| 2,114,896 | Axe | Apr. 19, 1938 |
| 2,485,648 | Norquist | Oct. 25, 1949 |